UNITED STATES PATENT OFFICE.

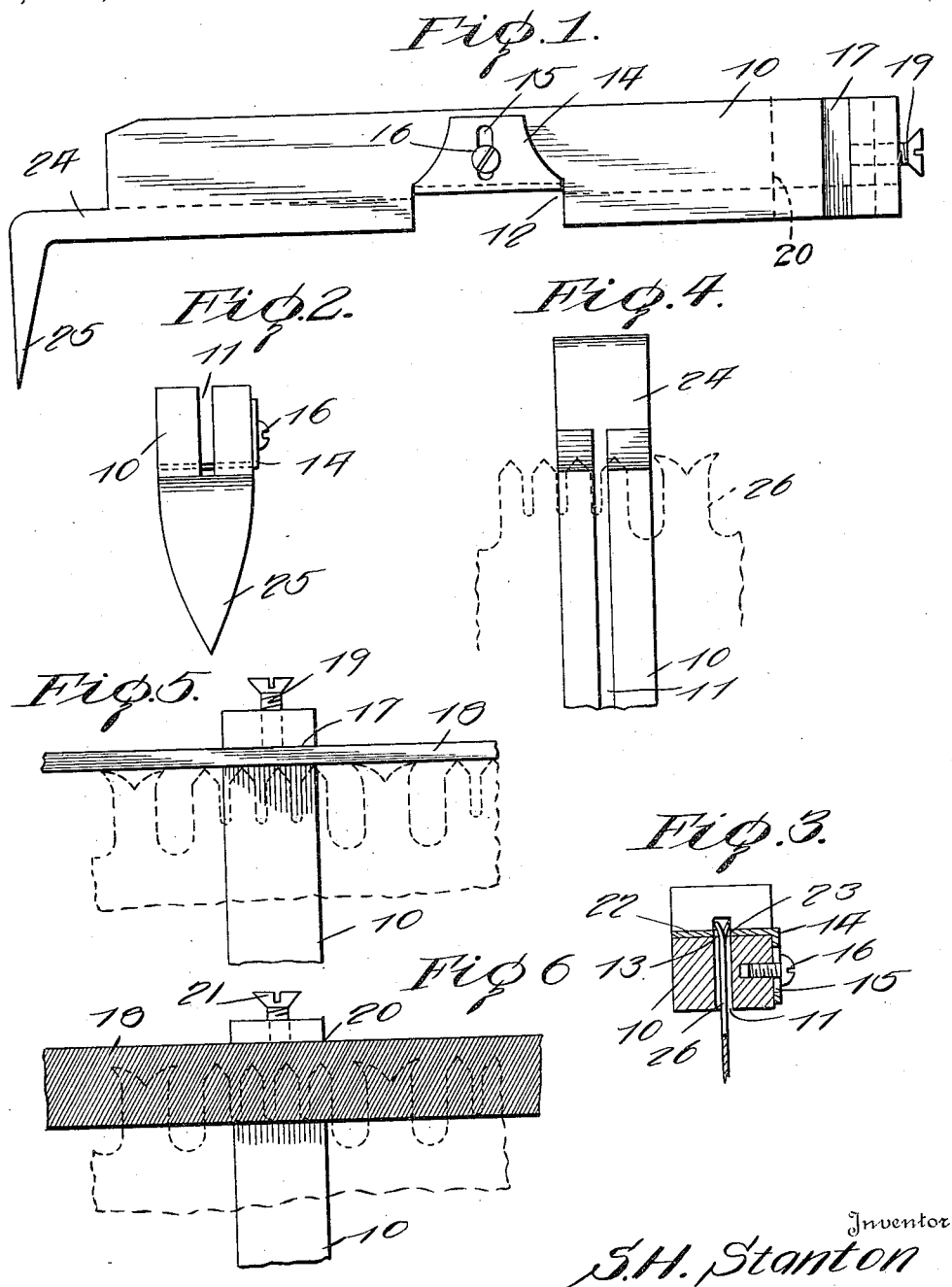

SAMUEL H. STANTON, OF CARBONDALE, OHIO.

SAW-TOOL.

1,173,888.

Specification of Letters Patent.   Patented Feb. 29, 1916.

Application filed January 9, 1914. Serial No. 811,221.

*To all whom it may concern:*

Be it known that I, SAMUEL H. STANTON, a citizen of the United States, residing at Carbondale, in the county of Athens, State of Ohio, have invented certain new and useful Improvements in Saw-Tools; and I do hereby declare the following to be a full, clear, and exact description of the invention, such as will enable others skilled in the art to which it appertains to make and use the same.

This invention relates to improvements in saw tools, and particularly to tools for jointing, setting and sharpening the teeth of saws.

The principal object is to provide a simple device of this character in which a single tool is capable of performing the above named functions.

Another object is to provide such a device that the same can be used in the field or woods without the necessity of taking the saw to a work shop.

Other objects and advantages will be apparent from the following description, when taken in connection with the accompanying drawing.

In the drawing: Figure 1 is a side elevation of the improved saw tool. Fig. 2 is an end elevation of the same. Fig. 3 is a transverse section showing the use of the device for gaging the teeth of the saw. Fig. 4 is a sectional view illustrating the use of the device when setting the teeth. Fig. 5 is a sectional view showing the use of the device as a jointer. Fig. 6 is a sectional view showing the device in position for filing the sides of the teeth.

Referring particularly to the accompanying drawing, 10 represents an elongated body formed preferably of metal and having a longitudinally extending kerf or channel 11 of a width to easily receive the toothed edge of a saw blade. This channel is formed through one edge of the body portion, and formed through the opposite edge transversely thereof is a notch or recess 12. Formed through the bottom wall of this notch or recess and through the bottom wall of the channel 11 is a longitudinally extending slot 13. An angle plate 14 has one portion provided with an elongated slot 15 through which is disposed a set screw 16 engaged in a threaded opening in one side of the body portion below the recess 12. Formed in the side face of the body to which the angle plate 14 is secured, and extending transversely of the face is a narrow channel 17 in which is adapted to be placed the edge of the file 18, a set screw 19 being arranged in the end of the body and adapted to bear on the face of the file to hold the same tightly in the channel. At a corresponding point on the other face of the body is a wider transverse channel 20 in which the file is to be placed with its flat face against the body and have the screw 21 bear against the edge. The angle plate 14 has a horizontal portion 22 which extends through the recess 12 transversely of the body where it is formed with an elongated slot 23 registering with the slot 13.

At the end of the body opposite to that which the file is attached is an extension 24 formed with an up-turned tang or spur 25, the purpose of which will appear in the description of the operation.

This device is particularly adapted for treating large toothed saws which have the drag or raker teeth. Referring particularly to Fig. 3 the body of the device is so disposed that the teeth of the saw project up into the channel 11, and by properly adjusting the angle plate 14, more or less of the points of the drag or raker teeth 26 can be made to project through the slot 23 of the plate. When sufficient amount of the tooth projects, a file is passed back and forth through the recess 12 so as to remove the projecting portion of the tooth to the level of the portion 22 of the angle plate. The device is then slipped along to the next raker tooth and the same operation performed thereon.

In Fig. 5 the file is secured in the channel 17 and then engaged on the tops of the teeth and moved longitudinally of the saw so as to file all of the teeth off to the same length. By securing the file in the wider channel 20, the sides of the teeth may be filed to rid them of any roughnesses which might remain after the other filings.

To adapt the device for setting the teeth of the saw, the body 10 is turned over and the point or tang driven into a log and the saw laid on the body over the channel 11. One of the cutting teeth 27 is caused to project over one of the beveled faces 28 formed at the end of the body 10, and a sharp blow given the tooth with a light hammer. This blow will bend or set the tooth so as to extend to the proper angle to one side or the other of the saw blade. The remainder of the cutting teeth are similarly treated until they are all set.

From the foregoing it will readily be seen that I have provided a simple device by means of which saws can be quickly and easily jointed, gaged, and set in the field where the saw is being used without the necessity of consuming time to take the saw to a shop.

What is claimed, is:—

A saw jointer comprising an elongated body having a transverse recess in the side face of one end for receiving the flat side of a file, the opposite side of said end having a narrow transverse channel for receiving the edge of a file, and a pair of screws carried in the end of the body and arranged to respectively enter said recess and channel to clamp a file.

In testimony whereof, I affix my signature, in the presence of two witnesses.

SAMUEL H. X STANTON.
his mark

Witnesses:
D. B. LOWRY,
A. E. STURGILL.

Copies of this patent may be obtained for five cents each, by addressing the "Commissioner of Patents, Washington, D. C."